US006177647B1

(12) United States Patent
Zapletal

(10) Patent No.: US 6,177,647 B1
(45) Date of Patent: Jan. 23, 2001

(54) ELECTRODE FOR PLASMA ARC TORCH AND METHOD OF FABRICATION

(75) Inventor: Jiri Zapletal, Cornish, NH (US)

(73) Assignee: Tatras, Inc., Claremont, NH (US)

( * ) Notice: Under 35 U.S.C. 154(b), the term of this patent shall be extended for 0 days.

(21) Appl. No.: 09/301,630

(22) Filed: Apr. 29, 1999

(51) Int. Cl.[7] ...................................................... B23K 9/00

(52) U.S. Cl. ................................ 219/121.52; 219/121.59

(58) Field of Search ......................... 219/121.52, 121.51, 219/121.59, 121.36, 146.21, 119, 121.48, 121.5; 313/631, 627

(56) References Cited

U.S. PATENT DOCUMENTS

| | | | | |
|---|---|---|---|---|
| 3,930,139 | * | 12/1975 | Bykhovsky et al. ............ | 219/146.21 |
| 4,766,349 | * | 8/1988 | Johansson et al. .................. | 313/631 |
| 4,769,524 | * | 9/1988 | Hardwick ........................ | 219/121.52 |
| 5,023,425 | | 6/1991 | Severence, Jr. ................. | 219/121.59 |
| 5,200,594 | | 4/1993 | Okada et al. ................... | 219/121.52 |
| 5,451,739 | * | 9/1995 | Nemchinsky et al. .......... | 219/121.51 |
| 5,676,864 | * | 10/1997 | Walters ........................... | 219/121.52 |

* cited by examiner

*Primary Examiner*—Teresa Walberg
*Assistant Examiner*—Quang Van
(74) *Attorney, Agent, or Firm*—Michael J. Weins; Jeffrey E. Semprebon

(57) ABSTRACT

An electrode for plasma arc torches has a tip body having a tip cavity with a cavity sidewall. An emissive insert having an insert sidewall resides in the tip cavity. A noble metal foil is interposed between the insert sidewall and the cavity sidewall. To fabricate the electrode, a tip body blank is provided, and a tip cavity having a cavity sidewall is formed therein. An emissive insert having an insert sidewall and being loosely insertable into the tip cavity is provided. The insert sidewall is provided with a textured surface with protuberances. A noble metal foil is selected, having an insert-contacting surface and a cavity-contacting surface. The emissive insert and the noble metal foil are placed into the tip cavity of the tip body blank, arranged such that the insert-contacting surface of the foil faces the insert sidewall of the emissive insert, while the cavity-contacting surface of the foil faces the cavity sidewall. After the emissive insert and the foil have been placed in the tip cavity, the tip body blank is placed into a die and radially deformed to compress the tip body blank and force the metal foil to conform to the textured surface of the insert sidewall. The deformed tip body blank is then machined to a final electrode configuration.

15 Claims, 4 Drawing Sheets

ELECTRODE FOR PLASMA ARC TORCH AND METHOD OF FABRICATION

FIELD OF INVENTION

The present invention relates to a plasma arc electrode for use in plasma arc torches and, in particular, to an electrode which can be readily fabricated and provides a long service life, as well as a method for making the same.

BACKGROUND OF THE INVENTION

Plasma arc torches are commonly used when fabricating metal structures. They are frequently employed in operations such as cutting, welding, treating surfaces, and annealing. These torches include an electrode which supports an arc which is struck between the electrode and the workpiece. The arc is sustained therebetween when the torch is in the arc transfer mode of operation. The electrodes currently used in many plasma arc torches have an electrode tip body fabricated from a high conductivity material such as copper or a copper alloy. An emissive insert is placed in the tip of the electrode. These emissive inserts are fabricated from materials with a low work function, and are frequently made from hafnium, zirconium, or tungsten. Further discussion of these electrodes is found in U.S. Pat. No. 5,023,425, which also notes that such electrodes have short lives, since the arc may become supported from the tip body of the electrode, rather than from the emissive insert, causing deterioration of the tip body. To extend the life of such electrodes, the '425 patent teaches providing a sleeve having a radial thickness of at least about 0.01 inches positioned between the emissive insert and the copper or copper alloy tip body of the electrode. This sleeve is fabricated from a metallic material having a work function which is greater than that of the material of the emissive insert, and maintains the arc being supported by the emissive insert. The '425 patent suggests the use of a variety of noble metals for the sleeve, and provides examples of electrodes employing silver sleeves.

The '425 patent teaches a method for fabricating such an electrode which includes the following steps. A first blank of copper or copper alloy is provided, having a front face. A cavity is bored in the front face. A second blank of silver is formed and is metallurgically bonded into the cavity of the first blank by use of a brazing material. An opening is then drilled into the second blank, and an emissive insert is force fitted into the drilled opening. The assembly is then machined to provide a smooth front face for the assembly.

U.S. Pat. No. 5,200,594 teaches an alternative solution to the problem of short electrode life by employing a plated emissive insert. The emissive insert is first plated with nickel and thereafter plated with a noble metal.

While the solutions of both of the above mentioned patents provide an electrode with a longer life, they complicate the process of fabricating the electrode. Furthermore, the electrodes of the '425 patent require substantial quantities of silver to fabricate, much of which is machined away during the manufacturing of the electrode. The method of the '594 patent reduces the quantity of the high work function metal which is required; however, it requires a double plating process where an intermediate layer of nickel is deposited onto the insert before plating with a noble metal. Furthermore, the '594 patent teaches that the use of a nickel plate is required to assure adhesion of plated layers during the subsequent processing. The adhesion is reported to be important to maintain a good thermal path for dissipating the heat generated in use, thereby extending the life of the electrode.

Thus, there is a need for an electrode which can be readily fabricated with little waste and which will provide a long service life.

SUMMARY OF THE INVENTION

The present invention relates to an electrode for use in plasma arc torches and a method for making the same. These electrodes have a tip body which is typically fabricated from copper or a copper alloy. The tip body is symmetrically disposed about a tip central axis and terminates in a torch engaging end and a free terminating surface. The free terminating surface is substantially normal to the tip central axis. The tip body is configured with a tip cavity, having a cavity sidewall which extends inward from the free terminating surface and is symmetrically disposed about the tip central axis. An emissive insert having an insert sidewall which is symmetrically disposed about an insert axis resides in the tip cavity and is positioned such that the insert axis and the tip central axis are substantially coincident.

The method of fabricating an electrode of the present invention is initiated by providing a tip body blank, which is typically either copper or a copper alloy. The tip body blank has a blank central axis and a free terminating surface which is substantially normal to the blank central axis.

A tip cavity is formed in the free terminating surface of the tip body blank. The tip cavity is configured such that it has a cavity sidewall which is symmetrically disposed about the blank central axis of the tip body blank.

An emissive insert is provided, having a textured insert sidewall symmetrically disposed about an insert axis. The emissive insert is configured to be loosely insertable into the tip cavity of the tip body blank, such that the insert axis is substantially coincident with the central axis of the tip body blank when the emissive insert is so inserted. The insert sidewall has a textured surface with protuberances incorporated therein to increase the effective surface area of the insert sidewall. Preferably, the protuberances are sufficient in size and number to increase the effective surface area by at least about 30%. Such a textured surface can typically be provided by grooves or by etching the surface of the insert sidewall.

A noble metal foil is selected, the foil having an insert-contacting surface and a cavity-contacting surface which are spaced apart by a thickness T of less than about 0.01 inches. While a variety of noble metal foils can be employed, including silver, gold, platinum, and rhodium, it is preferred that the foil be silver and it is further preferred that the silver foil have a purity of at least 99.5% by weight, and more preferably 99.7% by weight.

The emissive insert and the noble metal foil are placed into the tip cavity of the tip body blank, arranged such that the insert-contacting surface of the foil faces the insert sidewall of the emissive insert, while the cavity-contacting surface of the foil faces the cavity sidewall. The foil is of sufficient size to substantially surround the insert sidewall, providing a foil-wrapped insert.

When the emissive insert has a diameter of greater than about 0.06 inches, the insert-contacting surface of the noble metal foil is preferably wrapped around the insert sidewall to provide a foil-wrapped insert prior to insertion into the tip cavity. The tip cavity, the thickness T of the foil, and the emissive insert are sized such that the foil-wrapped insert can be readily inserted into the tip cavity. Since there is an elastic component to the deformation of the foil when it is bent around the emissive insert, it is frequently necessary to maintain the foil in position around the insert sidewall until the foil-wrapped insert is placed into the tip cavity.

Alternatively, when the emissive insert has a diameter of less than about 0.06 inches, the foil is preferably rolled, with the cavity-contacting surface facing outwards, and inserted into the tip cavity prior to inserting the emissive insert. Again, the elastic component of the deformation of the foil provides a spring like action. When the rolled foil is inserted into the tip cavity and released, the elasticity of the foil forces the cavity-contacting surface of the coiled foil into contact with the cavity sidewall. Again, the tip cavity, the thickness T, and the emissive insert are sized such that there is sufficient clearance to allow the insertion of the emissive insert into the foil-lined tip cavity to provide a foil-wrapped insert.

In either case, after the emissive insert and the foil have been placed in the tip cavity, the tip body blank is placed into a die and deformed normal to the tip central axis, providing a quasi-isotropic compression of the tip body blank.

When the tip body blank is so compressed, the cavity wall of the tip body blank exerts a force on the metal foil so that it conforms to the textured surface of the insert sidewall, thereby insuring intimate and extended contact between the insert-contacting surface of the metal foil and the insert sidewall. Since the foil is thin, the thickness T being less than about 0.01 inches and preferably less than about 0.06 inches, the deformation of the foil results principally from bending, and the cavity-contacting surface remains substantially parallel to the insert-contacting surface. This results in a textured cavity-contacting surface of the foil, which assures that there is intimate and extended contact between the cavity sidewall and the cavity-contacting surface. By maintaining the thickness T of the foil at a value greater than about 0.001 inches, and preferably greater than about 0.002 inches, the foil has sufficient strength to withstand lateral stresses induced by the deformation of the foil so as to maintain the integrity of the foil to avoid rupturing of the foil and loss of its continuity about the emissive insert.

The deformed tip body blank is then machined to a final configuration. The machining typically includes a turning operation, to remove any lateral seams introduced by the dies used to produce the deformation, and facing of the free terminating surface to assure that the foil-wrapped insert forms an integral part of the free terminating surface.

The electrode of the present invention, which can be fabricated by the above method, includes the standard elements of a tip body and an emissive insert. The tip body is typically copper or a copper alloy, and is symmetrically disposed about a tip central axis. The tip body terminates in a torch engaging end and free terminating surface, the free terminating surface being substantially normal to the tip central axis. The tip body has a tip cavity, having a cavity sidewall which extends inwards from the free terminating surface and is symmetrically disposed about the tip central axis.

The emissive insert has an insert sidewall which is symmetrically disposed about an insert axis. The insert sidewall is a textured surface, having protuberances incorporated therein. The emissive insert resides in the tip cavity and is positioned such that the insert axis and the tip central axis are substantially coincident.

A noble metal foil is located between the cavity sidewall and the insert sidewall. The noble metal foil has a thickness T and terminates in an insert-contacting surface and a cavity-contacting surface. The foil is maintained in engaging contact with the cavity sidewall and the insert sidewall such that the insert-contacting surface is in direct and intimate contact with the insert sidewall of the emissive insert, and the cavity-contacting surface is in direct and intimate contact with the cavity sidewall of the tip body.

It is preferred that the thickness T of the foil be less than about 0.01 inches, and more preferably be further limited to less than about 0.006 inches, to assure direct and intimate contact between the cavity-contacting surface of the noble metal foil and the cavity sidewall of the tip body.

It is also preferred that the thickness T of the foil be at least about 0.001 inches, and more preferably at least about 0.002 inches, to enhance the effectiveness of the metal foil in extending the life of the resulting electrode by assuring continuity of the foil.

While the foil can be selected from a variety of the noble metals and alloys such as silver, gold, platinum, and rhodium, the preferred metal is silver which has a high resistance to oxidation in combination with a high thermal conductivity. It is further preferred that the silver have a purity level of at least 99.93% and more preferably 99.95% by weight.

BRIEF DESCRIPTION OF THE FIGURES

FIG. 1 is an exploded view showing the components which form the electrode. FIG. 2 illustrates the components assembled into an electrode assembly. FIG. 3 illustrates the electrode assembly being pressed in a die to provide engaging contact of the noble metal foil with the cavity sidewall and the insert sidewall. FIG. 4 illustrates the electrode assembly after pressing. FIG. 5 illustrates the finished electrode assembly after machining.

BEST MODE OF CARRYING THE INVENTION INTO PRACTICE

Figure 1:
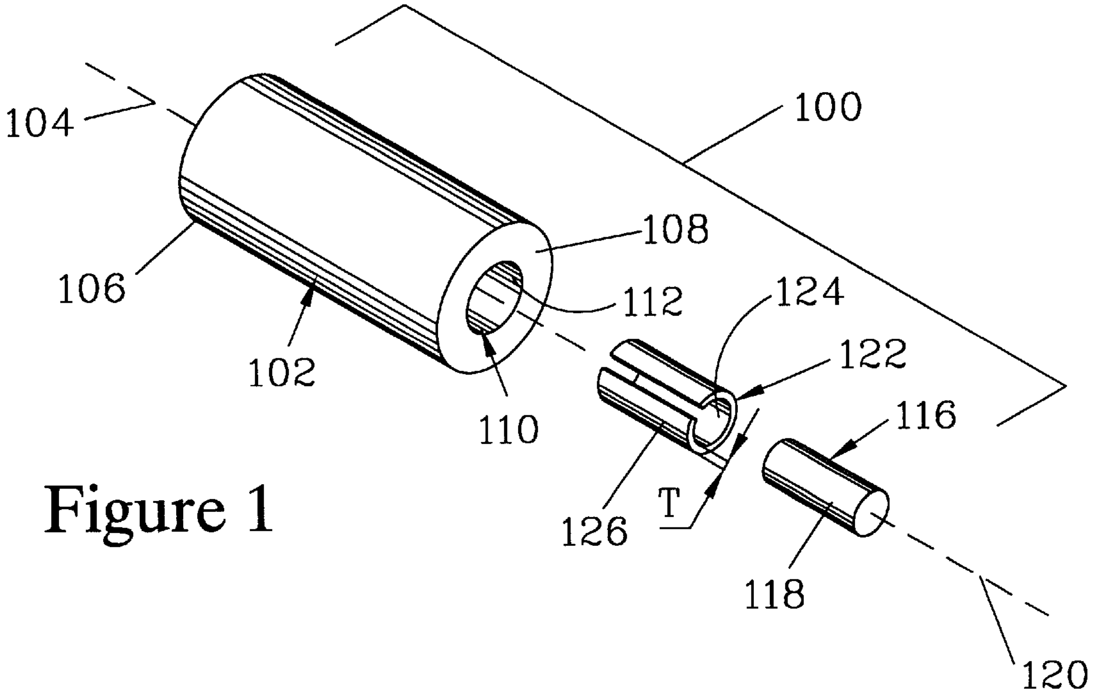
FIGS. 1 through 5 illustrate a sequence of steps for a method for fabricating an electrode of the present invention.

FIGS. 1 through 5 illustrate steps in a method for fabrication of an electrode of the present invention. FIG. 1 is an assembly drawing of an electrode assembly blank 100. An electrode body blank 102 is provided. The electrode body blank 102 has a central axis 104 and terminates in a torch engaging end 106 and in a free terminating surface 108, which is substantially normal to the central axis 104. A tip cavity 110 is drilled or counterbored into the free terminating surface 108, providing the tip cavity 110 with a cavity sidewall 112 that is symmetrically disposed about the central axis 104.

An emissive insert 116 having an insert sidewall 118 symmetrically disposed about an insert axis 120 is provided. The emissive insert 116 is formed from a metal which has a high work function, and preferably is formed of hafnium, tungsten, or zirconium. The emissive insert 116 is configured so as to be loosely insertable into the tip cavity 110 when the insert axis 120 is substantially aligned with central axis 104.

The insert sidewall 118 is textured, providing protuberances (not shown) therein. The protuberances are discussed in greater detail below and illustrated in FIGS. 12*a* and 12*b*. The protuberances preferably increase the effective surface area of the insert sidewall 118 by at least about 30%. The textured surface may be provided by forming the emissive insert 116 from extruded stock which has been extruded through a die which is configured to leave a series of longitudinal grooves on the insert sidewall 118. Alternatively, the surface of the insert sidewall 118 can be etched to form a mottled surface having protuberances.

A foil 122 is selected, which has an insert-contacting surface 124 and a cavity-contacting surface 126, separated by a thickness T. The foil 122 may be any of a variety of noble metals, including metals and alloys of silver, gold, platinum, and rhodium. If an alloy is selected, it is further preferred that it be a single phase alloy, and still further preferred that the alloy be a low alloy material (e.g., the base metal at least 99% of the total weight). It is further preferred that the foil 122 be silver to provide a high degree of resistance to oxidization in combination with a high thermal conductivity, and more preferably is at least 99.93% silver by weight.

The thickness T of the foil 122 is selected to be not less than about 0.001 and not greater than about 0.01 inches to assure proper plastic behavior of the foil 122, as is discussed in greater detail below.

Figure 2:
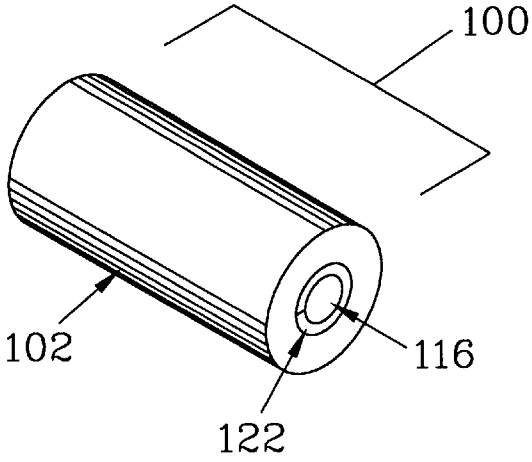

FIG. 2 illustrates the electrode body blank 102 into which the emissive insert 116 and the foil 122 have been inserted to form the electrode assembly blank 100. The emissive insert 116 and the foil 122 are arranged such that the foil 122 surrounds the emissive insert 116, with the insert-contacting surface 124 of the foil 122 facing the insert sidewall 118. The cavity-contacting surface 126 of the foil 122 thus faces the cavity sidewall 112 of the electrode body blank 102.

Figure 3:
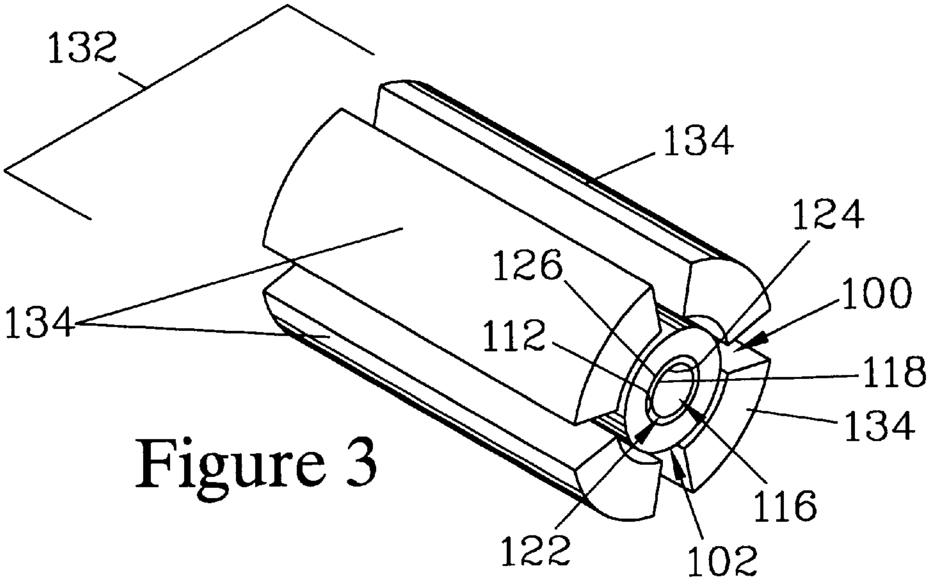

FIG. 3 illustrates the electrode assembly blank 100, having the emissive insert 116 surrounded by the foil 122 positioned in the tip cavity 110, loaded into a multi-part die 132 having jaws 134 which radially compress the electrode body blank 102 about the emissive insert 116 and the foil 122. The multi-part die 132 typically has three to eight jaws. The electrode body blank 102 is copper or a copper-based alloy which has sufficient malleability to be plastically deformed by the die 132 to make engaging contact with the foil 122.

The foil 122 is selected to have a combination of thickness and malleability such that, when the electrode body blank 102 is radially compressed, the insert-contacting surface 124 of the foil 122 makes engaging contact with the insert sidewall 118, and the cavity-contacting surface 126 makes engaging contact with the cavity sidewall 112. Placing an upper limit on the thickness T at about 0.01 inches assures that the foil 122 remains sufficiently thin for the insert-contacting surface 124 and the cavity-contacting surface 126 of the foil 122 to remain substantially parallel during deformation of the foil 122 between the insert sidewall 118 and the cavity sidewall 112. Placing a lower limit on the thickness T of about 0.001 inches assures that the deformation of the foil 122 does not result in any substantial discontinuity of the foil 122 between the insert sidewall 118 and the cavity sidewall 112, thereby assuring effective performance of the foil 122 in preventing transfer of an arc from the emissive insert 116 to the electrode body blank 102.

It is preferred that the foil 122 be selected to have the thickness T no greater than about 0.006 inches to enhance the parallel relationship of the insert-contacting surface 124 and the cavity-contacting surface 126. It is further preferred that the foil 122 be selected to have the thickness T no less than about 0.002 inches to assure continuity of the foil 122 between the insert sidewall 118 and the cavity sidewall 112.

Preferably, the magnitude of radial deformation of the electrode body blank 102 should be greater than the difference between the diameter of the tip cavity 110 and the combined diameter of the emissive insert 116 and the foil 122. For example, when the emissive insert 116 has a diameter of 0.060 inches and the foil 122 has a thickness of 0.002 inches, providing an effective combined diameter of 0.064 inches, the cavity diameter is slightly larger to allow inserting the emissive insert 116 and the foil 122 thereinto. For this example, the tip cavity 110 would typically have a diameter of about 0.074 inches, providing an effective gap of 0.005 inches. For such dimensions, compression of the electrode body blank 102 sufficient to cause a radially inward deformation of about 0.020 inches has been found to be effective in providing engaging contact between the insert-contacting surface 124 and the insert sidewall 118, and between the cavity-contacting surface 126 and the cavity sidewall 112.

Figure 4:
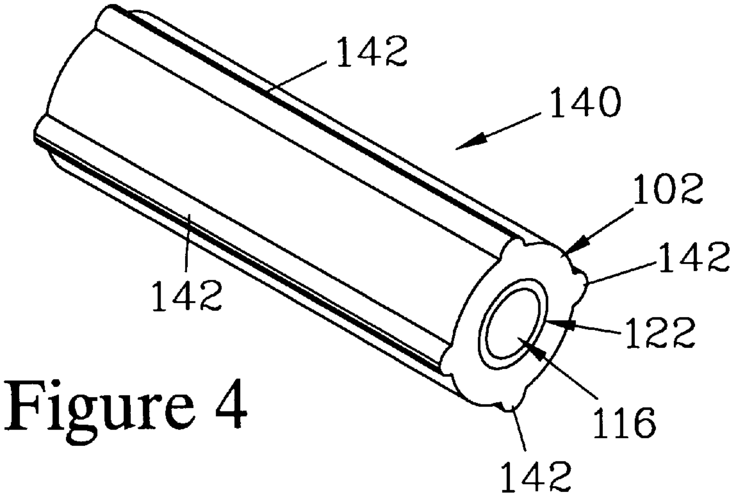
Figure 5:
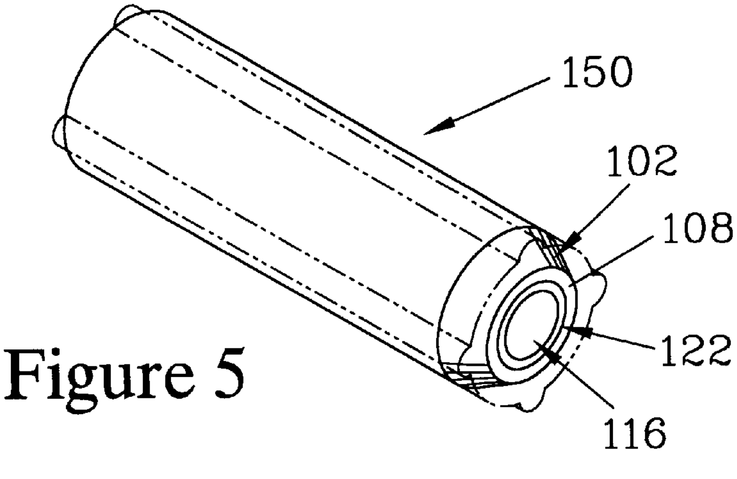

FIG. 4 illustrates a pressed electrode assembly blank 140 which has lateral ridges 142 resulting from the pressing in the die 132. The pressed electrode assembly blank 140 is then machined to eliminate the lateral ridges 142 and to contour the free terminating surface 108, providing a finished electrode 150 as illustrated in FIG. 5.

Figure 6:
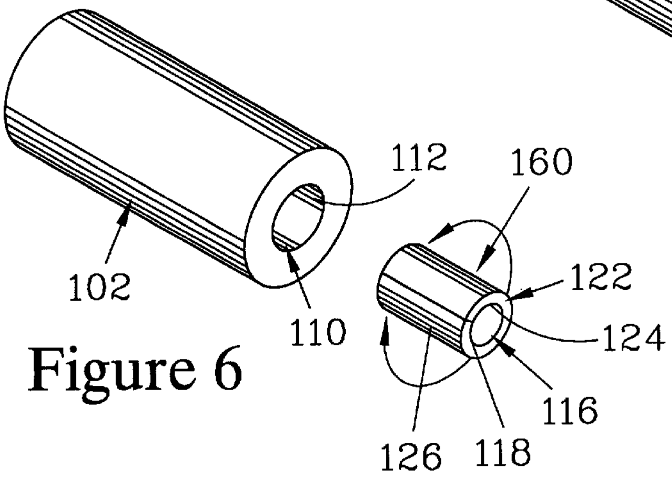
FIGS. 6 and 7 illustrate steps for one method of inserting an emissive insert and a foil into a tip cavity of an electrode assembly.
Figure 7:
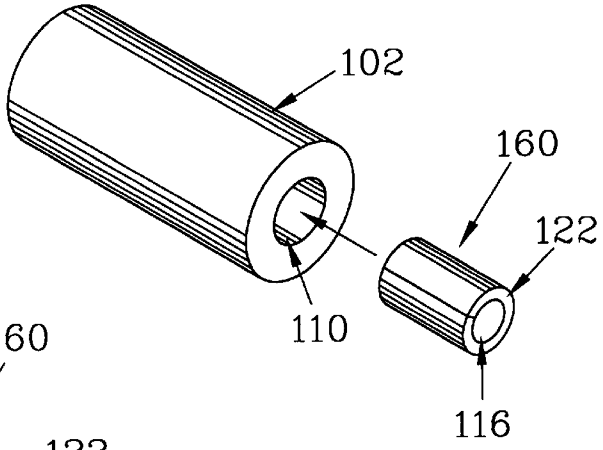

FIGS. 6 and 7 illustrate one set of steps used for placing the emissive insert 116 and the foil 122 into the electrode assembly blank 100 when the emissive insert 116 is relatively large, having a diameter of greater than about 0.06 inches. FIG. 6 illustrates the insert-contacting surface 124 of the foil 122 being wrapped around the insert sidewall 118 of the emissive insert 116 to form a foil-wrapped insert 160.

As indicated in FIG. 7, the wrapped insert 160 is then placed into the tip cavity 110 of the electrode body blank 102. This arranges the emissive insert 116 and the foil 122 such that the insert-contacting surface 124 of the foil 122 faces the insert sidewall 118, and the cavity-contacting surface 126 of the foil 122 faces the cavity sidewall 112.

Figure 8:
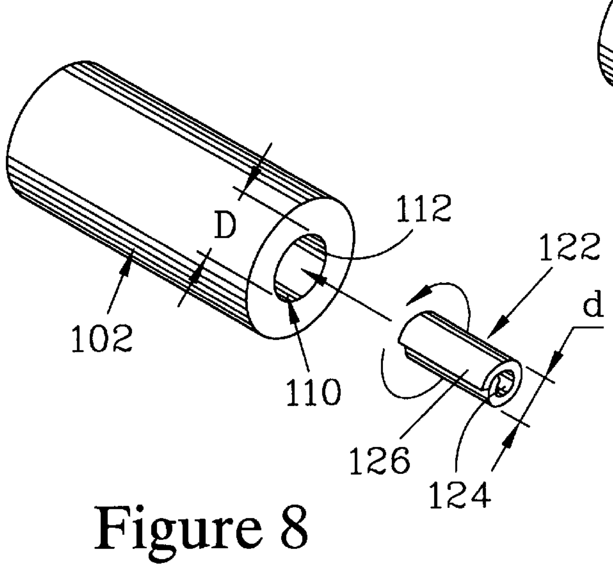
FIGS. 8 and 9 illustrate alternative steps for assembling the emissive insert and the foil into the tip cavity of the electrode assembly.
Figure 9:
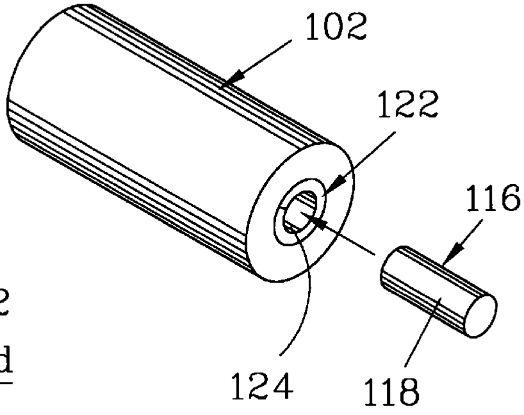

FIGS. 8 and 9 illustrate alternative steps for placing the emissive insert 116 and the foil 122 into the electrode assembly blank 100, when the emissive insert 116 is relatively small and has a diameter of less than about 0.06 inches. As shown in FIG. 6, the foil 122 is rolled up, with the cavity-contacting surface 126 facing outwards. The foil 122 is rolled to a foil diameter d which is less than a cavity diameter D of the tip cavity 110. The rolled foil 122 is then inserted into the tip cavity 110. Typically, the foil 122 has a degree of elasticity, and when inserted expands until the cavity contacting surface 126 contacts the cavity sidewall 112.

As indicated in FIG. 9, the emissive insert 116 is then inserted into the tip cavity 110 such that the insert-contacting surface 124 of the foil 122 surrounds the insert sidewall 118.

Figure 10:
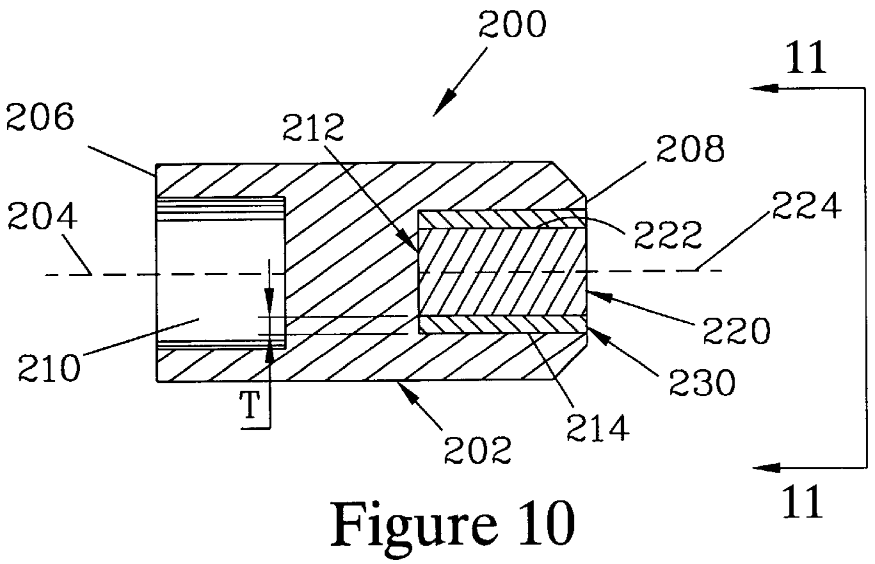
FIG. 10 is a longitudinal cross section view of an electrode of the present invention. The electrode has a tip body having a central axis and a free terminating surface substantially normal to the central axis. A tip cavity having a cavity sidewall resides in the tip body and extends to the free terminating surface. An emissive insert has an insert sidewall which is surrounded by a noble metal foil. The emissive insert and the foil are positioned in the tip cavity such that the foil is engaged with both the cavity sidewall and the insert sidewall.
Figure 11:
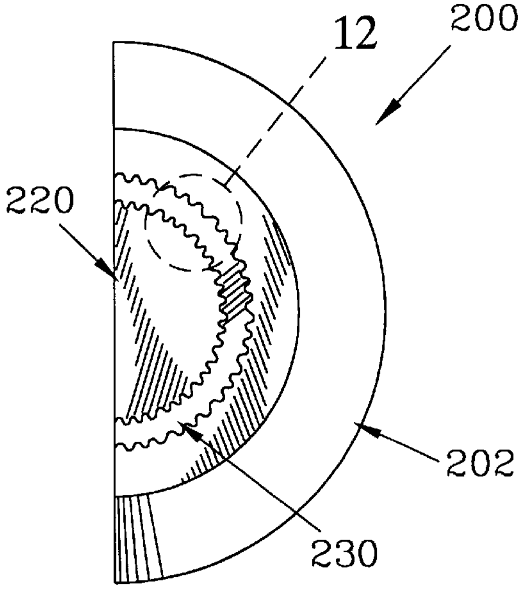
FIG. 11 is a view from the plane 11—11 of FIG. 10, illustrating the radial spatial relationship of the tip body, the foil, and the emissive insert.

FIG. 10 is a longitudinal cross section of a plasma arc electrode 200 of the present invention, which is fabricated by the methods illustrated in FIGS. 1–9. The plasma arc electrode 200 has an electrode tip body 202 having a central axis 204 and terminating in a torch engaging end 206 and a free terminating surface 208. The free terminating surface 208 is substantially normal to the central axis 204. The torch engaging end 206 frequently has a cooling chamber or passage 210 therein, through which a cooling fluid circulates to cool the electrode 200 during use. The electrode tip body 202 has a tip cavity 212 having a cavity sidewall 214. The cavity sidewall 214 is symmetrically disposed about the central axis 204. The cavity sidewall 214 extends to and terminates in the free terminating surface 208 of the electrode tip body 202.

An emissive insert 220 is provided, which is fabricated from a metal which has a high work function, preferably hafnium, tungsten, or zirconium. The emissive insert 220 has an insert sidewall 222 which is symmetrically disposed about an insert axis 224. The insert axis 224 is coincident with the central axis 204.

Figure 12A:
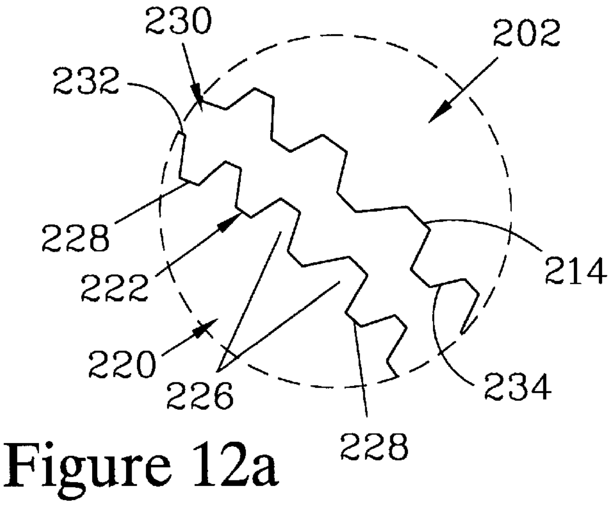
FIG. 12*a* is a detail view of the region 12 of FIG. 11, illustrating details of one embodiment of the electrode of the present invention. In this embodiment, protuberances in the insert sidewall are provided by forming longitudinal grooves in the surface. The foil conforms to these grooves, providing interlocking engaging contact between the insert sidewall and the foil, and between the foil and the cavity sidewall.
Figure 12B:
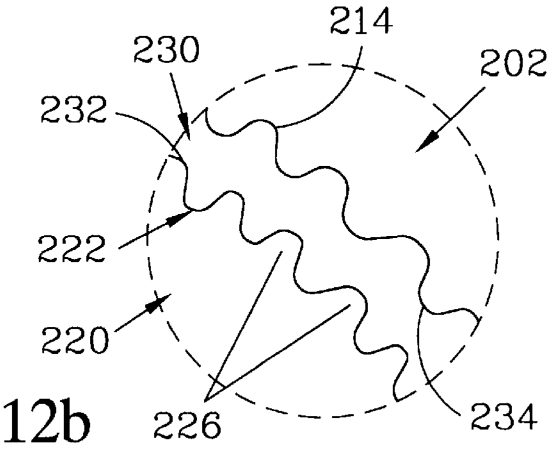
FIG. 12*b* is a detail view showing the same region as FIG. 12*a*, but where the surface of the insert sidewall has been etched to provide a mottled surface to which the foil conforms.

The insert sidewall 222 is textured, having protuberances 226 incorporated therein. The protuberances 226 may be induced while extruding the emissive insert 220 by passing the emissive insert 220 through a die configured to leave a series of longitudinal grooves 228 on the insert sidewall 222, as shown in FIG. 12*a*. Frequently, such texturing is provided when extruding stock from which the emissive insert 220 is cut. Alternatively, the insert sidewall 222 can be etched to provide a mottled surface having the protuberances 226, as shown in FIG. 12*b*.

Interposed between the cavity sidewall 214 and the insert sidewall 222 is a noble metal foil 230. The noble metal foil 230 has an insert-contacting surface 232 and a cavity-contacting surface 234, which are separated by a thickness T. The insert-contacting surface 232 of the noble metal foil 230 is in engaging contact with the insert sidewall 222 of the emissive insert 220, while the cavity-contacting surface 234 of the noble metal foil 230 is in engaging contact with the cavity sidewall 214 of the electrode tip body 202. The character of the engaging contact is determined, in part, by the properties of the insert sidewall 222, the thickness T of the foil 230, and the character of the material of the foil 230.

It is preferred that the noble metal of the foil 230 be silver, which is highly resistant to oxidation and is highly thermally conductive. It is further preferred that the noble metal be at least 99.93% silver by weight.

The thickness T of the foil 230 should be between about 0.001 and 0.01 inches to assure proper plastic behavior of the foil 230. The upper limit of thickness assures that the foil 230 remains sufficiently thin to assure that the insert-contacting surface 232 and the cavity-contacting surface 234 of the foil 230 remain substantially parallel after deformation of the foil 230 between the insert sidewall 222 and the cavity sidewall 214. The lower limit of thickness assured that the deformation of the foil 230 does not result in discontinuity of the foil 230 between the insert sidewall 222 and the cavity sidewall 214.

It is preferred that the thickness T of the foil 230 be maintained less than about 0.006 inches to enhance the parallel relationship of the insert-contacting surface 232 and the cavity-contacting surface 234. It is further preferred that the thickness T of the foil 230 be maintained greater than about 0.002 inches to more positively assure continuity of the foil 230 for more effective performance in preventing transfer of an arc from the emissive insert 220 to the electrode tip body 202.

While the novel features of the present invention have been described in terms of particular embodiments and preferred applications, it should be appreciated by one skilled in the art that substitution of materials and modification of details obviously can be made without departing from the spirit of the invention.

What I claim is:

1. An electrode for use in plasma arc torches, the electrode comprising:

a tip body fabricated from copper or a copper alloy, said tip body having a central axis and a free terminating surface substantially normal to said central axis;

a tip cavity having a cavity sidewall, said tip cavity residing in said tip body and extending to said free terminating surface;

an emissive insert having an insert sidewall which is textured to provide a textured surface, said insert sidewall being substantially symmetrical about said central axis of said tip body and said emissive insert forming part of said free terminating surface when said emissive insert is positioned in said tip cavity;

a foil of a noble metal interposed between said cavity sidewall and said insert sidewall, said foil having an insert-contacting surface, which is in interlocking, engaging contact with said textured surface of said insert sidewall, and a cavity-contacting surface, which is substantially parallel to said insert-contacting surface so as to be in interlocking, engaging contact with said cavity sidewall, said insert-contacting surface and said cavity-contacting surface being separated by a thickness T of less than about 0.01 inches.

2. The electrode of claim 1 wherein said thickness T is between about 0.002 and 0.006 inches.

3. The electrode of claim 2 wherein said foil is silver.

4. The electrode of claim 3 wherein said silver has a purity of at least about 99.93%.

5. The electrode of claim 4 wherein said textured surface is provided by scoring the surface to form a series of grooves.

6. The electrode of claim 4 wherein said textured surface is formed by etching to form a mottled surface.

7. The electrode of claim 1 wherein said textured surface increases the surface area of said insert sidewall by at least about 30%.

8. A method for fabricating an electrode having an emissive insert for use in plasma arc torches, the method comprising the steps of:

providing a copper tip blank, the tip blank having a central axis and a free terminating surface substantially normal to the central axis;

boring a tip cavity in the free terminating surface of the tip blank, the tip cavity having a cavity sidewall symmetrically disposed about the central axis of the tip blank;

providing the emissive insert, the emissive insert having an insert sidewall symmetrically disposed about an insert axis, the emissive insert being configured so as to be loosely insertable into the tip cavity and, when so inserted, positioned such that the insert axis is substantially coincident with the central axis of the tip blank;

texturing the insert sidewall;

providing a noble metal foil having an insert-contacting surface and a cavity-contacting surface separated by a thickness which allows the foil to be interposed between the insert sidewall and the cavity sidewall;

positioning the emissive insert and the foil into the tip cavity, the foil being interposed between the insert sidewall and the cavity sidewall with the insert-contacting surface of the foil facing the insert sidewall of the emissive insert, and the cavity-contacting surface of the foil facing the cavity sidewall of the tip blank;

deforming the tip blank sufficiently to assure interlocking engaging contact of the insert-contacting surface of the foil with the textured insert sidewall of the emissive insert, and of the cavity-contacting surface of the foil with the cavity sidewall of the tip blank, whereby the insert-contacting surface of the foil becomes mechanically interlocked with the textured insert sidewall of the emissive insert, and the cavity-contacting surface of the foil becomes mechanically interlocked with the cavity sidewall; and machining the tip blank to form the electrode tip.

9. The method of claim 8 wherein the emissive insert has a diameter of greater than about 0.06 inches, further wherein said step of positioning the emissive insert and the foil into the tip cavity further comprises:

wrapping the insert-engaging surface of the foil around the insert sidewall to provide a foil-wrapped insert; and positioning the foil-wrapped insert into the tip cavity.

10. The method of claim 9 where the foil is chosen to be silver having a purity of at least 99.3% silver by weight, and further wherein said step of texturing the insert sidewall further comprises:

passing the emissive insert through a die configured to provide longitudinal grooves.

11. The method of claim 9 where the foil is chosen to be silver having a purity of at least 99.3% silver by weight, and further wherein said step of texturing the insert sidewall further comprises:

etching the insert sidewall to provide a mottled surface of the insert sidewall.

12. The method of claim 8 wherein the emissive insert has a diameter of less than about 0.06 inches, further wherein said step of positioning the emissive insert and the foil into the tip cavity further comprises:

rolling the foil with the cavity-contacting surface facing outwards to a diameter less than that of the tip cavity;

inserting the rolled foil into the tip cavity and allowing the foil to expand such that the cavity-engaging surface of the foil resides against the cavity sidewall; and positioning the emissive insert into the tip cavity such that the foil is interposed between the insert sidewall and the cavity sidewall.

13. The method of claim 12 where the foil is chosen to be silver having a purity of at least 99.3% silver by weight, and further wherein said step of texturing the insert sidewall further comprises:

passing the emissive insert through a die configured to provide longitudinal grooves.

14. The method of claim 12 where the foil is chosen to be silver having a purity of at least 99.3% silver by weight, and further wherein said step of texturing the insert sidewall further comprises:

etching the insert sidewall to provide a mottled surface of the insert sidewall.

15. The method of claim 8 wherein said step of texturing the insert sidewall increases the surface area of the insert sidewall by at least about 30%.

* * * * *